United States Patent
Schoeneborn et al.

(10) Patent No.: US 11,548,217 B2
(45) Date of Patent: Jan. 10, 2023

(54) APPARATUS AND METHOD FOR PRODUCING LARGE WORKPIECES BY MEANS OF A MOBILE PRODUCTION UNIT

(71) Applicant: SLM Solutions Group AG, Lübeck (DE)

(72) Inventors: Henner Schoeneborn, Lübeck (DE); Dieter Schwarze, Lübeck (DE); Toni Adam Krol, Lübeck (DE); Lukas Roesgen, Lübeck (DE); Jan Wilkes, Lübeck (DE)

(73) Assignee: SLM Solutions Group AG

( * ) Notice: Subject to any disclaimer, the term of this patent is extended or adjusted under 35 U.S.C. 154(b) by 336 days.

(21) Appl. No.: 16/644,095

(22) PCT Filed: Sep. 5, 2017

(86) PCT No.: PCT/EP2017/072202
§ 371 (c)(1),
(2) Date: Mar. 3, 2020

(87) PCT Pub. No.: WO2019/048022
PCT Pub. Date: Mar. 14, 2019

(65) Prior Publication Data
US 2020/0189184 A1    Jun. 18, 2020

(51) Int. Cl.
*B29C 64/153*    (2017.01)
*B33Y 10/00*    (2015.01)
(Continued)

(52) U.S. Cl.
CPC ............ *B29C 64/153* (2017.08); *B22F 10/20* (2021.01); *B23K 26/342* (2015.10); *B28B 1/001* (2013.01);
(Continued)

(58) Field of Classification Search
None
See application file for complete search history.

(56) References Cited

U.S. PATENT DOCUMENTS

2004/0094728 A1    5/2004 Herzog et al.
2005/0038551 A1    2/2005 Mazumder et al.
(Continued)

FOREIGN PATENT DOCUMENTS

CN    104527067    4/2015
CN    105125316    12/2015
(Continued)

OTHER PUBLICATIONS

CN 105499573, Wang et al, Machine Translation from WIPO (Year: 2016).*

(Continued)

*Primary Examiner* — Colin W. Slifka
(74) *Attorney, Agent, or Firm* — Williams Mullen; Thomas F. Bergert

(57) ABSTRACT

The invention relates to an apparatus (10) for producing a three-dimensional workpiece, comprising:
 a carrier (12) adapted to receive material (14) for producing the workpiece;
 at least one mobile production unit (24),
 a moving unit (18) that is adapted to move the mobile production unit (24) relative to the carrier (12) so as to position the mobile production unit (24) oppositely to different sections of the carrier (12);
 a sensing unit that is adapted to generate sensor signals relating to a relative arrangement of the mobile production unit (24) and the carrier (12); and
 a control unit that is configured to, in addition to the positioning of the mobile production unit (24) via the moving unit (18), provide at least one fine positioning function to compensate for an offset from a desired
(Continued)

relative arrangement of the mobile production unit (24) and the carrier (18) based on the sensor signals generated by the sensing unit. The invention further relates to a method for producing a three-dimensional workpiece.

14 Claims, 4 Drawing Sheets

(51) Int. Cl.
*B33Y 30/00* (2015.01)
*B33Y 40/00* (2020.01)
*B33Y 50/02* (2015.01)
*B23K 26/342* (2014.01)
*B29C 64/393* (2017.01)
*B29C 64/227* (2017.01)
*B29C 64/371* (2017.01)
*B28B 1/00* (2006.01)
*B22F 10/20* (2021.01)
*B22F 10/30* (2021.01)

(52) U.S. Cl.
CPC .......... *B29C 64/227* (2017.08); *B29C 64/371* (2017.08); *B29C 64/393* (2017.08); *B33Y 10/00* (2014.12); *B33Y 30/00* (2014.12); *B33Y 40/00* (2014.12); *B33Y 50/02* (2014.12); *B22F 10/30* (2021.01)

(56) References Cited

U.S. PATENT DOCUMENTS

| | | | |
|---|---|---|---|
| 2014/0175708 A1 | 6/2014 | Echigo et al. |
| 2014/0374935 A1 | 12/2014 | Flitsch et al. |
| 2017/0095977 A1 | 4/2017 | Thresh et al. |

FOREIGN PATENT DOCUMENTS

| | | |
|---|---|---|
| CN | 105291428 | 2/2016 |
| CN | 105328902 | 2/2016 |
| CN | 105408094 | 3/2016 |
| CN | 105499573 | 4/2016 |
| CN | 106938536 | 7/2017 |
| DE | 10053742 | 9/2002 |
| EP | 2835249 | 2/2015 |
| JP | 1995-088967 | 4/1995 |
| JP | 2015-078434 | 4/2015 |
| JP | 2016535687 | 11/2016 |
| WO | 2017080646 | 5/2017 |

OTHER PUBLICATIONS

Japanese Patent Office, Office Action for Japanese Application No. 2020-513510, dated Feb. 16, 2021.
International Search Report and Written Opinion for PCT/EP2017/072202, European Patent Office, dated May 24, 2018.
Office Action, China PAT Intellectual Property Office, CN Patent Application No. 201780094486.1, dated Apr. 21, 2021.
China National Intellectual Property Administration, Office Action for CN Application 201780094486.1, dated Nov. 16, 2021.

* cited by examiner

APPARATUS AND METHOD FOR PRODUCING LARGE WORKPIECES BY MEANS OF A MOBILE PRODUCTION UNIT

CROSS-REFERENCE TO RELATED APPLICATIONS

This application is the U.S. national phase of international application PCT/EP2017/072202, filed on Sep. 5, 2017 which is hereby incorporated herein in its entirety by reference.

The present invention relates to an apparatus and method for producing large three-dimensional workpieces according to an additive layer construction method.

In additive layering methods, workpieces are produced layer-by-layer by generating a sequence of solidified and interconnected workpiece layers. These processes may be distinguished by the type of raw material and/or the way of solidifying said raw material in order to produce the workpiece.

For example, powder bed fusion is a kind of additive layering process by which pulverulent, in particular metallic and/or ceramic raw materials, can be processed to three-dimensional workpieces of complex shapes. To that end, a raw material powder layer is applied onto a carrier and subjected to laser radiation in a site selective manner in dependence on the desired geometry of the workpiece that is to be produced. The laser radiation penetrating into the powder layer causes heating and consequently melting or sintering of the raw material powder particles. Further raw material powder layers are then applied successively to the layer on the carrier that has already been subjected to laser treatment, until the workpiece has the desired shape and size. Selective laser melting or laser sintering can be used in particular for the production of prototypes, tools, replacement parts or medical prostheses, such as, for example, dental or orthopaedic prostheses, on the basis of CAD data.

On the other hand, fused deposition modelling or material jetting represent different types of additive layering processes. In this case, non-solidified raw material is supplied to a type of printing head which deposits said material onto a carrier where it then solidifies.

An important parameter of additive layer construction methods is the quality of the produced workpieces. Moreover, the production efficiency is crucial, e.g. in the sense of keeping production cycles as short as possible. For example, numerous strategies are known for speeding up the production of single workpiece layers. However, when producing large workpieces, known solutions do not always achieve the desired efficiency and/or quality.

Therefore, it is an object of the present invention to improve the efficiency during the additive layer production of large workpieces while maintaining a sufficient level of quality.

This object is addressed by an apparatus and a method as described herein.

An apparatus for producing a three-dimensional workpiece according to the invention comprises a carrier adapted to receive material for producing the workpiece. Depending on the type of additive layering process realized by means of the apparatus, the material can be a raw material powder, e.g. for performing a selective laser melting procedure, or a molten material that solidifies on the carrier.

In general, the carrier may define a build area within which the workpiece is produced. The carrier may be a movable (e.g. vertically movable) carrier. Preferably, however, the carrier is vertically and/or horizontally stationary.

In one embodiment, the shape and/or outline of the carrier is adapted to an outer contour of the workpiece, e.g. by being non-rectangular. Also, the carrier may comprise a substrate plate, which e.g. may be detachably connected to a carrier base structure and/or configured to directly receive the deposited raw material powder.

In one example, the apparatus as a whole or at least the carrier and/or a subsequently discussed mobile production unit may be arranged within a process chamber. Said process chamber may be sealable against the ambient atmosphere, i.e. against the environment surrounding the process chamber, in order to be able to maintain a controlled atmosphere, in particular an inert atmosphere within the process chamber. Yet, it is also considered that the process chamber may be open to one side to allow access to the carrier contained therein (e.g. to allow accessing the carrier by means of the mobile production unit discussed below).

In case the material for producing the workpiece is a raw material powder, said powder preferably is a metallic powder, in particular a metal alloy powder, but may also be a ceramic powder, a plastic or polymeric powder, or a powder containing different materials. The powder may have any suitable particle size or particle size distribution. It is, however, preferable to process powders of particle sizes <100 μm. In case the material for producing the workpiece is a molten material, said material may be chosen from any of the above examples and is preferably a plastic or polymeric material.

The apparatus further comprises at least one mobile production unit. The mobile production unit may be a multi-part or multi-component unit that represents a jointly movable and/or integrated unit. In one example, the mobile production unit is an integrated unit that is coupled to and movable by a moving unit as detailed below.

The mobile production unit comprises a solidification device adapted to produce solidified material layers on the carrier in order to produce the workpiece by an additive layer construction method. In the context of the present disclosure and unless indicated to the contrary or obviously non-applicable, the formulation "on the carrier" may be understood as referring to something taking place within a plane or footprint of the carrier, without, however, necessarily requiring a direct contact with a surface thereof. Differently put, this may relate to something being directly or indirectly supported by the carrier. For example, the production of solidified material layers "on the carrier" by means of the solidification device may not necessarily require a direct contact of the produced material layers and the carrier. Rather, it may also relate to producing such layers on top of layers being already present thereon, i.e. the produced layers being indirectly supported by the carrier.

As further detailed below, the solidification device may take the form of an irradiation device or a printing head for depositing material. In the latter case, the solidification device produces the solidified material layers by depositing the molten material in such a manner that it solidifies at predetermined sites on the carrier, thereby producing layers of solidified material.

The mobile production unit may further comprise a material supply device adapted to supply material to the carrier and/or the solidification device. In case of the solidification device comprising an irradiation device (e.g., the apparatus carrying out a selective laser melting process), the material supply device may supply raw material powder directly to the carrier, which may then be irradiated by means of the irradiation device. In case of the solidification device comprising a molten-material printing head (e.g., the apparatus carrying out a material jetting process), the material supply device may supply material to a printing head of the solidification device.

Additionally or alternatively, the mobile production unit may further comprise a gas supply system adapted to supply a shielding gas to the carrier and/or an area to be irradiated. In general, the shielding gas may be directed to and/or along an uppermost material layer that is currently solidified. The shielding gas may be provided in form of a suitable protective or inert gas for avoiding undesired reactions between the material to be solidified and the surrounding atmosphere.

The gas supply system may comprise a gas outlet which opens into a portion of the mobile production unit facing the carrier. The gas supply system may also comprise a gas inlet for removing gas from the mobile production unit and/or the carrier, for example in order to realise a protective gas circuit within the apparatus. The gas supply system may be connected to a gas flow generating device, such as a compressor, for supplying the shielding gas to the carrier.

Finally, the mobile production unit may, additionally or alternatively, comprise a layer depositing mechanism for forming the supplied material into a material layer on top of the carrier (or on top of a material layer being already deposited thereon). The layer depositing mechanism may take the form of a slider or blade which is movable simultaneously to and/or independently of a movement of the mobile production unit across the carrier. When the material for producing the workpiece is a raw material powder, the layer depositing mechanism may ensure before and/or after selectively solidifying the raw material powder, that said powder forms a substantially level layer. Similarly, when the material is a molten material, the layer depositing mechanism may ensure that after the molten material is deposited, the resulting surface of the solidified workpiece layer is level.

The apparatus further comprises a moving unit that is adapted to move the mobile production unit relative to the carrier so as to position the mobile production unit oppositely to different sections of the carrier. In one example, the carrier is generally horizontally arranged in space and the moving unit moves the mobile production unit above different sections of the carrier, i.e. so as to be arranged oppositely thereto and facing the carrier.

The apparatus further comprises a sensing unit that is adapted to generate sensor signals relating to a relative arrangement of the mobile production unit and the carrier. The sensing unit may comprise at least one suitable sensor for generating the respective sensor signals, e.g. an optical sensor. The sensing unit may be connected or connectable to a control unit of the apparatus in order to forward the generated sensor signals thereto. The sensing unit can be at least partially mounted to the mobile production unit or a surrounding thereof, e.g. to a ceiling area of the apparatus facing the carrier. The relative arrangement may in particular relate to a relative arrangement within the horizontal spatial plane and/or indicate whether the mobile production unit is accurately positioned above a predetermined section of the carrier. Additionally or alternatively, the relative arrangement may relate to a predetermined distance between the mobile production unit and the carrier or, differently put, a relative arrangement of the mobile production unit and carrier along a vertical spatial axis.

The apparatus further comprises a control unit that is configured to, in addition to the positioning of the mobile production unit via the moving unit, provide at least one fine positioning function to compensate for an offset from a desired relative arrangement of the mobile production unit and the carrier based on the sensor signals generated by the sensing unit. The fine positioning function may be provided and/or activated independently of a first rough positioning via the moving unit, e.g. by applying actuating mechanisms which operate independently of said moving unit. Additionally or alternatively, the fine positioning function may be provided and/or activated after a (e.g. first rough) positioning by means of the moving unit has been completed and the sensing unit has generated the sensor signals with regard to the resulting relative arrangement. Differently put, the fine positioning function may be provided after and/or in response to a first rough positioning of the mobile production unit via the moving unit.

Moreover, based on said sensor signals, the offset from the desired relative arrangement can be determined. In case an offset from the desired relative arrangement is detected, e.g. by means of the control unit and/or based on said sensor signals, the fine positioning function may be provided and/or activated in order to compensate for said offset.

Additionally or alternatively, the fine positioning function may be substantially continuously provided, for example so as to continuously adjust a position of the mobile production unit, e.g. when moving the latter across the carrier. Differently put, the fine positioning function may provide a substantially continuously operating feedback control mechanism in order to ensure a correct positioning of the mobile production unit.

In sum, the moving unit may allow for a rough positioning of the mobile production unit, whereas the fine positioning function may allow for a fine positioning of the mobile production unit, in particular in response to a remaining offset being detected by means of the sensing unit. Thereby, the apparatus according to the present invention may ensure that a particularly accurate positioning of the mobile production unit above a predetermined section of the carrier is achieved.

According to a further embodiment, an area of the carrier receiving the raw material is larger than an area that can be solidified by the mobile production unit without being moved by the moving unit. In other words, when maintaining the moving unit and thus the mobile production unit in a fixed position, an area that can be solidified in said fixed position may be smaller than a total area of the carrier. Accordingly, in order to solidify material across the whole area of the carrier, it may be necessary to move the mobile production unit by means of the moving unit.

Note that this embodiment may be employed for producing particularly large workpieces. In such a case, providing a respectively large solidification device that is able to solidify material across the whole area of the carrier without being moved may unduly increase the overall costs. In other words, it may be cheaper to provide a smaller solidification device and move it by means of the moving unit across different sections of the carrier.

In one example, the solidification device comprises an irradiation device for selectively irradiating electromagnetic or particle radiation onto predetermined sites of the material applied onto the carrier. As previously noted, the material may in this case be provided in form of a raw material powder and/or the additive layering construction method may be based on selective laser melting.

In general, the irradiation device may be configured to heat the raw material powder upon irradiation to a specific temperature which allows a site-selective sintering and/or melting of the material (e.g., in form of a raw material powder) in order to generate a layer of the three-dimensional workpiece. The apparatus may be configured to, in a generally known manner, carry out a cyclic process by adding a further layer or segments thereof of raw material onto the carrier, and specifically onto the just produced segments of the workpiece layer, after the irradiation device has completed producing a segment of the workpiece layer. Following that, the irradiation device can again perform site-selective irradiation to produce a further workpiece layer on top of the previous one. This can be repeated until the workpiece is completed.

The irradiation device may comprise a sintering/melting radiation source, such as a laser source, and at least one optical unit for guiding and/or processing a sintering/melting radiation beam emitted by the sintering/melting radiation source. The optical unit may comprise optical components such as an object lens, in particular an f-theta lens, and a scanner unit, the scanner unit may comprise a diffractive optical element and a deflection mirror.

The irradiation device may comprise only one irradiation unit or a plurality of irradiation units each being adapted to emit electromagnetic or particle radiation which allows a site-selective sintering and/or melting of the raw material powder from a sintering/melting radiation emission plane. In one example, the irradiation device comprises a number of irradiation units being arranged in a grid- or matrix-type pattern, the irradiation units e.g. taking the form of laser LEDs or so-called VCSELs. The irradiation unit(s) may be stationary within the mobile production unit and/or may be movable, e.g. along a linear axis within the mobile production unit. In an alternative embodiment, the solidification device comprises a printing head that is adapted to deposit material so as to solidify at predetermined sites on the carrier. As previously noted, in this case the material deposited by the printing head may at least temporarily be in a non-solidified or molten form. Also, the additive layer construction method may be based on a fused deposition modelling or material jetting principle.

The fine positioning function may adjust a relative position between the mobile production unit and/or selected components thereof and the carrier, for example by means of an actuating unit arranged between the moving unit and the mobile production unit. Again, the adjustment may take place based on or in accordance with the sensor signals provided by the sensing unit. In general, the adjustment may be chosen so as to ensure that the solidified material is produced at the desired sites on the carrier, e.g. by adjusting a position of the optional printing head or the irradiation device.

The likewise optional actuating unit arranged between the moving unit and the mobile production unit may be provided in form of a three-dimensional moving mechanism that is e.g. configured to displace the mobile production unit relative to the moving unit. Thus, a rough positioning may be achieved by means of the moving unit, whereas the fine positioning may be carried out by means of the actuating unit.

In one example, the relative position between the carrier and the mobile production unit is adjusted by moving the mobile production unit in an orthogonal direction with respect to the carrier. In other words, a distance between the moving unit and the carrier may be adjusted, preferably along a vertical axis. This may be carried out by means of the moving unit, e.g. after a positioning of the mobile production unit above a predetermined section of the carrier has been completed.

In a further embodiment, the fine positioning function includes adjusting a state and/or position of at least one component of the irradiation device. In other words, the irradiation device may be controlled so as to adjust an orientation and/or extension of the radiation beam omitted thereby, so as to compensate for an undesired offset between the mobile production unit and carrier and/or the topmost layer or relevant layer segment. This may be achieved by e.g. adjusting a position or orientation of a scanning unit or mirror of the irradiation device accordingly. In one example, the fine positioning function includes performing a calibration of at least one component of the irradiation device, the component e.g. being an optical element such as an optional scanner.

Additionally or alternatively, compensating for the offset may generally be achieved by actuating the moving unit, the previously discussed optional actuating unit and/or a subsequently discussed horizontal moving device. Note that these latter offset-compensation mechanisms including adapting the irradiation device are generally applicable to all embodiments of the present invention, unless indicated to the contrary.

According to a further example, the fine positioning function includes identifying an irradiation start point, for example, by identifying a transition zone between an irradiated and a non-irradiated section of the material. This may be relevant after the mobile production unit has irradiated a predetermined section and is moved by the moving unit to an adjacent section of the carrier. In this case, the irradiation should be continued starting from and/or by referring to the already irradiated section of the material on the carrier. Thus, after a rough positioning of the mobile production unit by means of the moving unit, the fine positioning function may introduce further adjustments so as to ensure that the irradiation commences from the correct irradiation start point.

Again, this may be realised by adjusting a position of the mobile production unit and/or selected components thereof or by adjusting the irradiation device appropriately. Also, the correct irradiation start point may be identified by means of suitable sensors (e.g. cameras with image processing capabilities) and/or by analysing a dataset with regard to the predetermined irradiation sites. Differently put, the correct irradiation start point may be measured and/or calculated. Note that an overlapping irradiation between adjacent sections may be realized. This may again require identifying a predetermined irradiation start point for producing the desired irradiation-overlap.

In a further development, the sensing unit includes distance sensors that are adapted to measure a distance between the mobile production unit and the carrier and/or an uppermost material layer deposited thereon. This way, a relative arrangement of the mobile production unit and carrier with regard to an axis extending orthogonally to the carrier may be detected, i.e. the distance sensors generating respective sensor signals relating to said relative arrangement. In consequence, the control unit may adjust the distance e.g. by moving the mobile production unit towards or away from the carrier along a vertical spatial axis.

Generally, the distance sensors may be configured as optical sensors. In one example, the distance sensors are arranged at the mobile production unit so as to face the carrier. This may help to improve the accuracy of the distance measurement.

According to a further embodiment, the sensing unit includes a sensor system that is adapted to measure a position of the mobile production unit within a plane extending in parallel to the carrier. This may help to ensure that the mobile production unit is arranged above a predetermined section of the carrier. Additionally, the vertical distance of the mobile production unit from said section may be adjusted as indicated earlier. In general, the signals generated by the sensor system may indicate an (e.g. horizontal) relative arrangement of the mobile production unit and carrier and may be used by the control unit to compensate for a respective offset therebetween.

In this connection, the sensor system may include at least one marker and at least one sensor adapted to sense a position of the marker and, optionally, wherein one of the marker and sensor is arranged at the mobile production unit and the other of the marker and sensor is arranged remote from the mobile production unit. The sensor may detect the marker's position based on an optical and/or electromagnetic detection. The marker's position may represent the sensor signal relating to the relative arrangement that is used by the control unit to realise the fine positioning function. For arranging the respective one of the marker and sensor remote from the mobile production unit, a ceiling area of the apparatus or its surrounding which preferably faces the carrier may be used (i.e., the marker or sensor being arranged thereat). On the other hand, for arranging the sensor or marker at the mobile production unit, a position facing said ceiling area may be employed, such as an upper side portion e.g. close or adjacent to where the moving unit connects to the mobile production unit.

Note that for measuring the distance and horizontal arrangement, the sensing unit may generally use the same and/or shared sensors (e.g. the distance sensors forming part of the above-discussed sensor system).

In further variants, the moving unit is configured according to at least one of the following:
the moving unit comprises at least one manipulator, for example a multi-axis robot;
the moving unit is mounted to a horizontal moving device for moving the moving unit along at least one horizontal spatial axis; and
the moving unit and/or horizontal moving device is adapted to move the mobile production unit in discrete steps and/or to move the mobile production unit in parallel to performing a solidification of the material.

The multi-axis robot may be a six-axis robot, such as a standard industrial robot in which the axes are arranged so as to define an open kinematic chain. In general, the moving unit may be mounted to an area or plane which is spaced apart from and/or extends at an angle with respect to the carrier (e.g. an angle of 90°). This may improve accessibility of the material to be solidified, e.g. compared to floor mounted moving units.

The horizontal moving device may comprise at least one horizontal axis, which may optionally be ceiling or floor mounted. The moving unit may be connected to said horizontal axis by way of a pedestal or base section. Alternatively, the moving device may comprise a driverless drive system, e.g. to freely move the moving unit to different positions on a floor area of the apparatus. In general, the horizontal moving device may include control systems (preferably feedback control systems) to ensure an accurate positioning and e.g. avoid undesired oscillations. This may be particularly relevant if performing a solidification in parallel to a movement of the mobile production unit.

When planning the workpiece production, any further degrees of freedom available via the moving unit and/or the optional horizontal moving device may be considered as respective control parameters, e.g. by the control unit of the apparatus.

The movement of the mobile production unit and/or the horizontal moving device in discrete steps may take place after a solidification of the material in a predetermined section of the carrier has been completed, e.g. in order to move to a subsequent section to be solidified. On the other hand, the movement in parallel to performing a solidification (e.g. via an irradiation) may take place continuously and/or at a predetermined speed.

According to further variants, the apparatus further comprises at least one of the following:
a further mobile production unit including an individually assigned further moving unit, wherein the moving units of the apparatus are movable independently of one another;
a further carrier, wherein the mobile production unit is preferably arrangeable above both carriers of the apparatus;
at least one post-processing unit that is configured to perform at least one of the following: removing non-solidified material from the carrier and/or the workpiece; removing burrs from the produced workpiece; removing support structures from the workpiece; separating the produced workpiece from the carrier.

Accordingly, the apparatus may comprise a first system consisting of a mobile production unit and moving unit as well as a second system consisting of the respective further mobile production unit and further moving unit. These may be individually operable, so that the mobile production units may be arranged above different sections of the carrier to simultaneously solidify said different sections.

By providing a further carrier, a production of several workpieces generated on the plurality of carriers can be realised. For doing so, the mobile production unit can be moved back-and-forth between said carriers to solidify respective material sections arranged thereon. Note that it is generally possible to produce several workpieces also when only one carrier is provided (i.e., several workpieces on said single carrier). On the other hand, when using several carriers, the overall number of workpieces that can be produced may generally be increased.

The post-processing unit may include suitable tools, such as a blower or vacuum tools for removing the non-solidified material, a grinder for removing burrs or a cutting tool for separating the workpiece from the carrier (and/or from a substrate plate comprised by said carrier). Also, the post-processing unit may generally be configured to perform a thermal finishing treatment of the workpiece and, optionally, comprise a respective heating tool for doing so. The post-processing units may be movable by means of an individually assigned moving unit, such as a multi-axis robot. In one example, one moving unit per different tool and/or post-processing task is provided.

In general, any media such as the material from which the workpiece is to be produced, a shielding gas or the like may be provided to the mobile production unit by means of dedicated lines, pipes or tubes. These are preferably fixedly installed at and guided along the moving unit towards the mobile production unit. Additionally or alternatively, service units, such as service robots, may be employed. These may include a media storage (e.g. for the respective material or shielding gas) which may be passed on to the mobile production unit and/or its moving unit if the need arises. Additionally or alternatively, the mobile production unit and/or its moving unit may connect to refill stations to refill e.g. a respective gas or material storage.

The invention further relates to a method for producing a three-dimensional workpiece, comprising the steps of:
depositing material for producing the workpiece on a carrier;

moving a mobile production unit via a moving unit so as to be positioned oppositely to the carrier, the moving unit being generally configured to move the mobile production unit relative to the carrier so as to arrange it above different sections of the carrier, wherein the mobile production unit comprises:

a solidification device adapted to generate solidified material layers in order to produce the workpiece by an additive layer construction method;

at least one of a material supply device adapted to supply material to the carrier, a gas supply unit adapted to supply a shielding gas to an area that is to be irradiated and a layer depositing mechanism for forming the supplied material into a material layer on top of the carrier;

the method further comprising the steps of:

generating sensor signals relating to a relative arrangement of the mobile production unit and the carrier and/or the topmost layer or layer segment; and providing, in addition to the positioning of the mobile production unit via the moving unit, at least one fine positioning function to compensate for an offset from a desired relative arrangement of the mobile production unit and the carrier based on the sensor signals.

The method may incorporate any further steps to provide any of the previously or subsequently discussed operating states, effects, functions and/or interactions. This relates in particular to dedicated steps of moving the mobile production unit in the above or below discussed manner or dedicated steps of sensing any of the above or below discussed parameters (e.g. positions or distances).

Preferred embodiments of the invention are explained in greater detail below with reference to the accompanying schematic drawings, in which.

Figure 1:
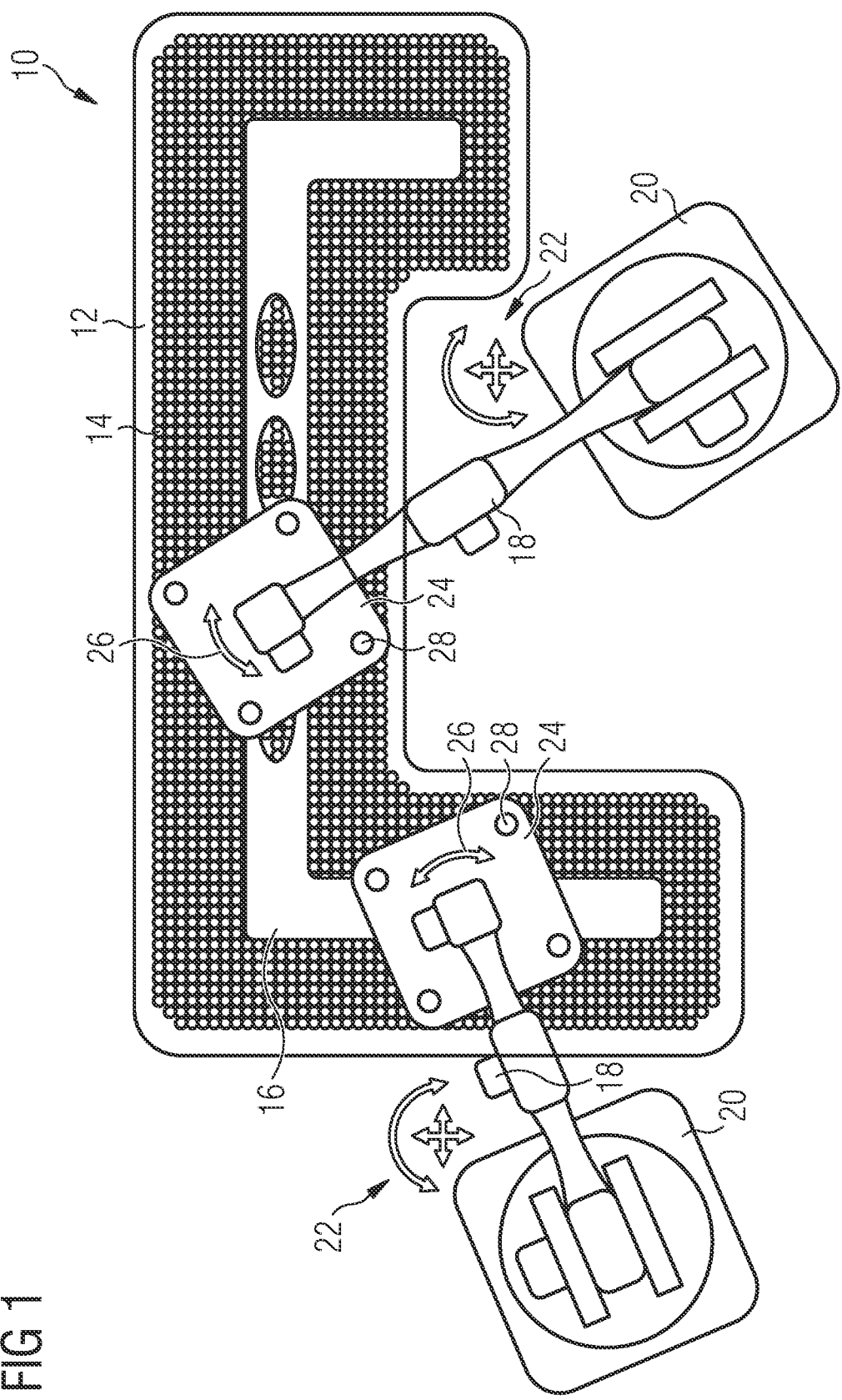
FIG. 1 shows a top view of an apparatus according to the invention, comprising a plurality of mobile production units and associated moving units.

In FIG. 1, a top view of an apparatus 10 according to an embodiment of the present invention is shown. The apparatus 10 is configured to perform an additive layer construction method for producing three-dimensional large workpieces according to a selective laser melting method. The workpieces may, for example, have a maximum length within the horizontal spatial plane of more than 1 meter, more than 2 meters or more than 3 meters.

The apparatus 10 comprises a carrier 12 which has a non-rectangular shape. Rather, as evident from the top view, the carrier 12 defines a substantially C-shaped plane on which material 14 in form of a raw material powder for producing the workpiece is deposited. As will be detailed below, from said material 14 a workpiece 16 is produced which has a similar C-shape or C-outline as the carrier 12.

The apparatus 10 further comprises two separate moving units 18 in form of a six-axis industrial robot. Each moving unit 18 is mounted on a driverless horizontal moving device 20. Said moving devices 20 allow for positioning the moving units 18 at different positions within a floor area of the apparatus 10. The degrees of freedom provided by the horizontal moving devices 20 are indicated by respective coordinate systems 22 in FIG. 1.

A respective positioning via the moving devices 20 may be done prior to and/or during and in dependence of producing a new type of workpiece. Additionally or alternatively, the moving units 18 may be displaced by means of the horizontal moving devices 20 during the production of a single workpiece, the moving devices 20 thereby dynamically enlarging the working space of the mobile production units 24 discussed below. Alternatively, the moving units 18 may be fixedly arranged in a floor area of the apparatus 10, wherein the exact positions may be adjusted in dependence on the workpiece to be produced, e.g. prior to starting the production of a new type of workpiece.

Attached to each moving unit 18 is a mobile production unit 24. As will be detailed below, by means of said mobile production unit 24, the raw material powder 14 can be solidified in a site-selective manner in order to produce the workpiece 16 layer-by layer. The mobile production unit 24 can be moved by the moving unit 18 and/or the horizontal moving devices 20 so as to face different predetermined sections of the carrier 12. One possible rotational degree of freedom which is provided by the wrist axes of the moving units 18 is indicated in FIG. 1 by a respective arrow 26 for each of the mobile production units 24.

Moreover, the position of markers 28 (and/or sensors 46, see below) on a topside of the mobile production units 24 facing away from the carrier 12 is indicated in FIG. 1. Each of the mobile production units 24 comprises four of such markers 28, not all of which are provided with a respective reference sign in FIG. 1. The function of the markers 28 will be discussed below with reference to the further figures.

In operation of the apparatus 10, the mobile production units 24 are moved across the carrier 12 so as to site-selectively solidify a (locally) uppermost layer of the raw material powder 14 deposited thereon. As will be detailed below, forming of said uppermost layer of raw material powder 14 may take place in parallel to said movement, i.e. the mobile production units 24 depositing sections of said layer which are immediately solidified in a site selective manner.

In general, the movement of the mobile production units 24 may take place in a discrete manner, e.g. by maintaining a substantially fixed position above the carrier 12 until a deposition and/or site-selective solidification of the (locally) uppermost raw material powder layer 14 has been completed. Following that, a discrete movement towards an adjacent section above the carrier 12 may take place, wherein the adjacent sections above of which the mobile production unit 24 is arranged preferably overlap one another. This may also include an overlapping irradiation and/or identifying an irradiation start point based on the already irradiated material 14 within a previously processed section of the carrier 12.

Alternatively, a substantially continuous movement of the mobile production units 24 may take place, preferably with a predetermined constant speed. In this case, depositing and/or site-selectively solidifying an uppermost raw material powder layer 14 may take place in parallel to a movement of the mobile production units 24.

Of course, it is also conceivable to move the mobile production units 24 individually and according to different strategies (e.g. one discretely and one continuously). Also, the movement strategy of each of the mobile production units 24 may be flexibly changed, e.g. in accordance with a currently produced workpiece layer or depending on a section of the carrier 12 which a mobile production unit 24 currently faces.

Figure 3:
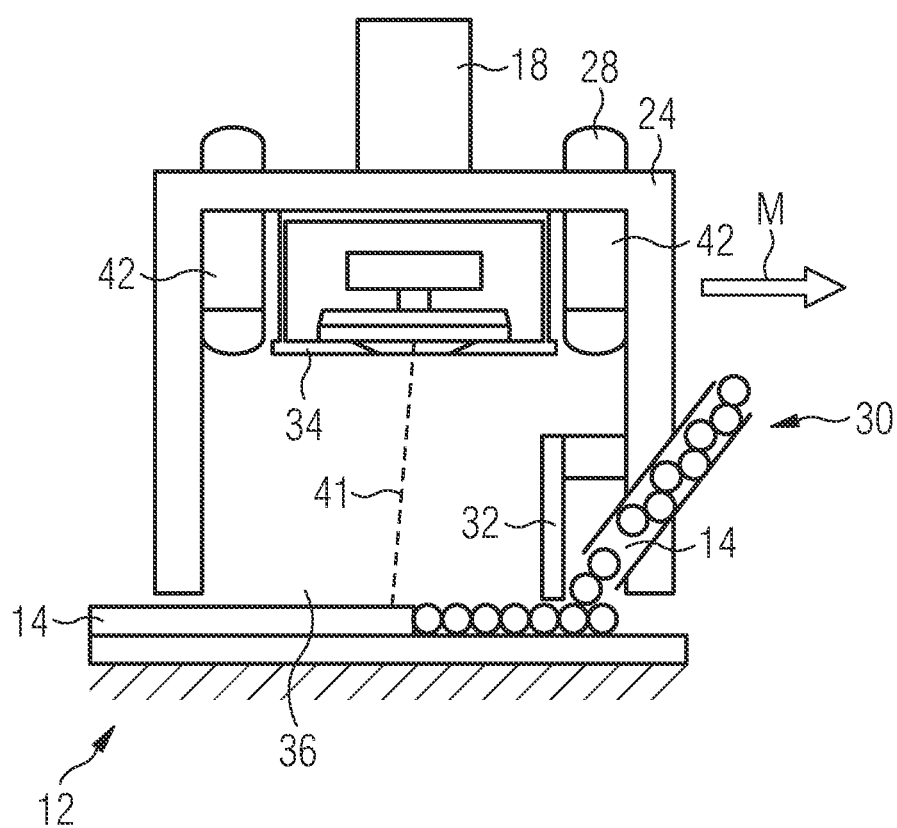
FIG. 3 shows a detailed view of the mobile production unit according to FIG. 1.

Referring to FIG. 3 in the following, the formation of a new uppermost raw material powder layer by means of one of the mobile production units 24 will be discussed. As indicated by an arrow M, the mobile production unit 24 is moved across the carrier 12 by means of an only partially illustrated moving unit 18. This movement generally takes place horizontally as well as in parallel to and at an equal distance to the carrier 12. During said movement, raw material powder 14 is deposited onto a previously irradiated and lower raw material powder layer, said deposited raw material powder 14 forming the new uppermost layer on the carrier 12.

Depositing the raw material powder is achieved by means of a material supply device 30 which, by means of a vacuum force, sucks in raw material powder 14 from a non-depicted supply line attached to the moving unit 18 and the mobile production unit 24. The material supply device 30 further directs said raw material powder 14 towards the carrier 12. Moreover, a blade element 32 acts as a layer depositing mechanism to, in accordance with the movement according to arrow M, form the raw material powder 14 into a level and uppermost new powder layer.

The mobile production unit 24 further comprises a solidification device 34 in form of a laser irradiation device emitting a site-selectively solidifying laser beam 41 according to a generally known configuration. This way, the raw material powder 14 is solidified in a selective laser melting manner.

Note that in FIG. 3, the mobile production unit 24 is oriented so that the material supply device 30 and layer depositing mechanism 32 are arranged in front of the irradiation device 34 when viewed in the movement direction M. Thus, a deposited section of the new uppermost raw material powder layer can be immediately irradiated by means of the irradiation device 34 while moving the mobile production unit 24 across the carrier 12.

In general, from FIG. 3 one can see that the mobile production unit 24 is formed as a hollow member confining an interior space 36 facing the carrier 12. Within said interior space 36, the irradiation device 24 as well as the layer depositing mechanism 32 and part of the material supply device 30 are arranged. Note that in FIG. 2 but also in each of FIGS. 3 and 4a)-d), the mobile production unit 24 is depicted as having an open side surface so as to show its interior components. Yet, it is generally contemplated that in each case the mobile production unit 24 is closed on five sides and only opens at its underside facing the carrier 12.

Coming back to FIG. 1, it is evident that numerous layers at different heights may be formed on top of the carrier 12 depending on the movement of the mobile production unit 24. For example, a base layer n may be present on the carrier 12, whereas one of the mobile production units 24 deposits and irradiates the subsequent and at least locally uppermost n+1 layer and the other mobile production unit 24 deposits and irradiates the overall uppermost n+2 layer. In this context, the movements of the mobile production units 24 must be coordinated in such a manner, that the mobile production unit 24 depositing the n+2 layer is only moved to sections where the other mobile production unit 24 has already completed depositing the n+1 layer. Note, however, that for starting to deposit the n+2 layer, it is not necessary that the n+1 layer has already been formed across the whole of the carrier 12.

On the other hand, it is also conceivable that the mobile production units 24 deposit different kinds of materials onto the carrier 12 (so-called multi-material deposition). In this case, a workpiece can be produced consisting of numerous regions, each region being formed by an individual material.

In view of the above, it is evident that the mobile production units 24 are mainly positioned relative the carrier 12 by means of the moving unit 18. Differently put, the moving units 18 perform a rough positioning function for arranging the mobile production units 24 relative to the carrier 12.

The depicted embodiment, however, further includes fine positioning functions for more accurately positioning the mobile production units 24 relative to the carrier 12. This way, it is more reliably ensured that the site selective irradiation and/or material deposition actually takes place as intended. This will be further discussed with reference to FIG. 2.

Figure 2:
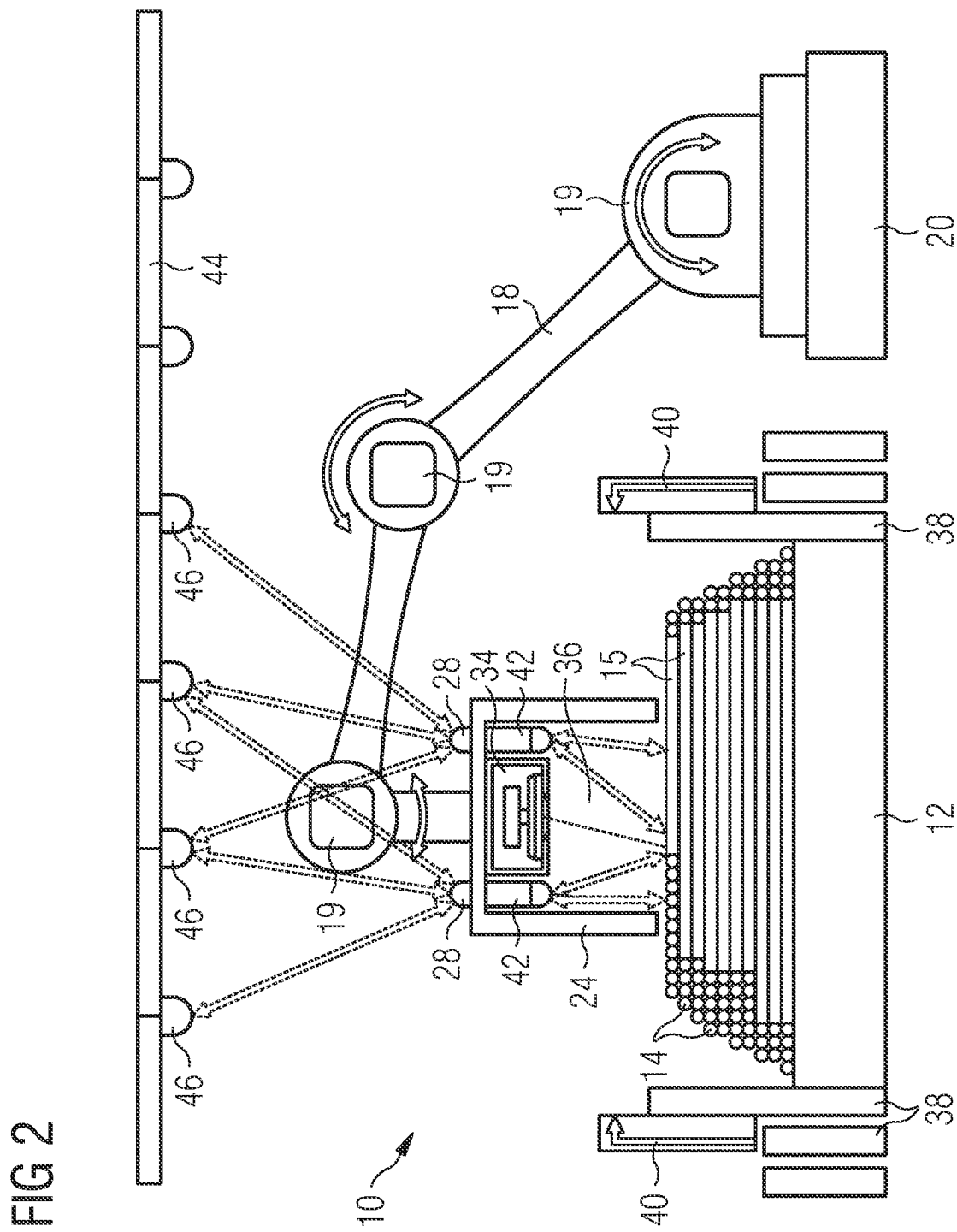
FIG. 2 shows a partial side view of the apparatus according to FIG. 1 for indicating a position detection of the mobile production unit.

In FIG. 2, a side view of the apparatus 10 is shown, in which only one of the moving units 18 carrying a mobile production unit 24 is visible. Again, it can be seen that the mobile production unit 18 is configured as a six-axis industrial robot, comprising numerous joints 19 forming respective axes (cf. curved arrows indicated in FIG. 2). Also, the horizontal moving device 20 moving the moving unit 18 across a floor area of the apparatus 10 is shown. Note that with respect to the mobile production unit 24, not all of its details according to FIG. 3 are included. In general, FIG. 3 only depicts an optional embodiment of a mobile production unit 24 which directly deposits material onto the carrier 12. Similar to the illustration in FIG. 2, the mobile production unit 24 may also be free of a respective powder depositing mechanism.

Moreover, a cross-section of the carrier 12 is depicted on top of which numerous already solidified workpiece layers 15 are provided. These are surrounded by respective layers of loose raw material powder 14. Along the outer edges of the carrier 12, optional sidewalls 38 are arranged (note: not specifically depicted in FIG. 1). These sidewalls 38 ensure that at an increasing build height of the workpiece formed by the workpiece layers 15, the loose raw material powder 14 as well as the shielding gas stays within the area of the carrier 12. In FIG. 2, the sidewalls 38 each comprise three different segments. At an increasing build height, these segments 38 may be stacked to enlarge the overall height of the resulting sidewall structure. A possible movement of the sidewalls 38 in reaction to an increasing build height is indicated by arrows 40 in FIG. 2.

Also, non-illustrated shielding gas supply nozzles may be provided, e.g. close to the tips of arrows 40, thus being equally arranged at the edges of the carrier 12 (note: not specifically depicted in FIG. 1). These shielding gas supply nozzles may be distributed along the edges of the carrier 12 in such a manner, so that the space above the carrier 12 containing the workpiece layers 15 and raw material powder 14 is reliably filled with shielding gas. Note that the aspect of a shielding gas supply system that is remotely arranged from the mobile production unit 24, and supplies shielding gas to a space on top of the carrier 12 (e.g. including the carrier 12, the powder 14 and/or workpiece layers 15) represents a general aspect of the present invention which is not restricted to the presently discussed embodiment.

In case the optional sidewalls 38 are not included, the invention alternatively considers depositing the material 14 in the sense of a debris cone on top of the carrier 12. In this context, the shielding gas may be provided by a fixedly arranged gas supply system, which could even cover a complete working chamber in which the apparatus 10 is arranged. In this case, suitable access and/or remote control means of the apparatus 10 may be provided to ensure a safe operability of the gas-filled working chamber.

As previously discussed, during a first rough positioning, the moving unit 18 arranges the mobile production unit 24 so as to face a predetermined section of the carrier 12. Prior to actually solidifying the raw material 14 deposited therein, a non-depicted control unit of the apparatus 10 activates a fine positioning function. In the shown embodiment, said fine positioning function includes amongst others positioning the mobile production unit 24 independently of the first rough positioning via the moving unit 18 in a vertical direction as well as in a horizontal plane with respect to the carrier 12.

For doing so, the apparatus 10 comprises sensing units which each include dedicated sensors as indicated below.

For example, for the fine positioning in the vertical direction, distance sensors 42 are arranged within the interior space 36 of the mobile production unit 24 and face the carrier 12. The distance sensors 42 may e.g. apply optical coherence tomography to sense a distance of the mobile production unit 24 and/or the irradiation device 34 to the carrier 12 and/or the material 14 or workpiece layers 15 arranged thereon. In case it is detected that the distance does not correspond to a desired set value, i.e. that an offset from a desired vertical relative arrangement is present, the vertical position of the mobile production unit 24 may be adjusted accordingly. This may be done by a non-depicted further actuation unit arranged between the moving unit 18 and mobile production unit 24 and/or by the moving unit 18 as such. In addition, however, adjusting a state and/or position of a component of the irradiation device 34 is done accordingly. In other words, the embodiment contemplates that in response to an incorrect relative arrangement having been detected, and actuation means apart from the moving unit 18 may be activated to compensate for set offset. The actuation means may e.g. be comprised by the irradiation device 34.

Also, the mobile production unit 24 may comprise a further non-depicted sensing unit for identifying an irradiation start point, e.g. by identifying an end point of an already irradiated material section on top of the carrier 12. If said irradiation start point does not correspond to an expected start point, as for example defined in a processing program of the apparatus 10, the position of the mobile production unit 24 and/or a setting of the irradiation device 34 may be adjusted accordingly in the above discussed manner. This identification of an irradiation start point represents a further optional fine positioning function that can be provided by means of the apparatus 10.

Finally, the apparatus 10 comprises a further sensing unit for identifying the horizontal position of the mobile production unit 24 above the carrier 12 (i.e., a position of the mobile production unit 24 in a plane extending horizontally as well as in parallel to the carrier 12). In this case, a plurality of markers 28 is arranged at a top portion or upper side of the mobile production unit 24 facing a ceiling area 44 of the apparatus 10. As can be gathered from FIG. 1, a total of four markers 28, one per corner of the upper side of the mobile production unit 24, is provided. At the ceiling area 44, a plurality of sensors 46 is provided facing the carrier 12 and sensing a position of the markers 28. The sensors 46 and markers 28 together form a sensor system for detecting the horizontal and/or vertical position of the mobile production unit 24. Note that the arrangement of the markers 28 and sensors 46 may also be reversed, i.e. the markers 28 being arranged at the ceiling area 44 and the sensors 46 being arranged on top of the mobile production unit 24. Moreover, a mixed distribution may be realized with some of the markers 28 and sensors 46 being arranged at the ceiling area and the respective remaining ones being arranged on top of the mobile production unit 24.

Likewise, it may generally be realized that the sensor system comprising the markers 28 and sensing units 46 is additionally or exclusively used for measuring a vertical position of the mobile production unit 24 in space. Based on this information, a distance to the carrier 12 and/or the material 14 deposited thereon may be calculated (e.g. when knowing the number of material layers on top of the carrier 12). Differently put and as a general aspect of the present invention, the apparatus 10 may comprise a single sensing unit which, by making use of one of the same sensor arrangement (e.g. the sensor system comprising the markers 28 and sensors 46), may detect both of a vertical as well as horizontal relative arrangement of the mobile production unit 24 and the carrier 12.

Finally, a fine positioning function may be provided through adjusting the state of the irradiation device 34. For example, the position and/or orientation of a scanning mirror of said irradiation device 34 may be adjusted so as to adapt an extension of the irradiation beam and the irradiation site in view of the determined offset.

Overall, the present embodiment thus provides a fine positioning function including adapting a vertical position of the mobile production unit 24 (e.g. via a measurement by the distance sensors 42 and a movement of either the moving unit 18 or a non-depicted intermediate actuating unit), adapting a position of the mobile production unit 24 within a horizontal plane (e.g. via a measurement by the sensor system comprising the markers 28 and sensors 46 and a movement of either the moving unit 18 or a non-depicted intermediate actuating unit) and adapting the position of the irradiation site and/or irradiation starting point (e.g. via a measurement of a non-depicted sensing unit and adjusting a scanning mirror of the irradiation device 34 accordingly).

Figure 4A:
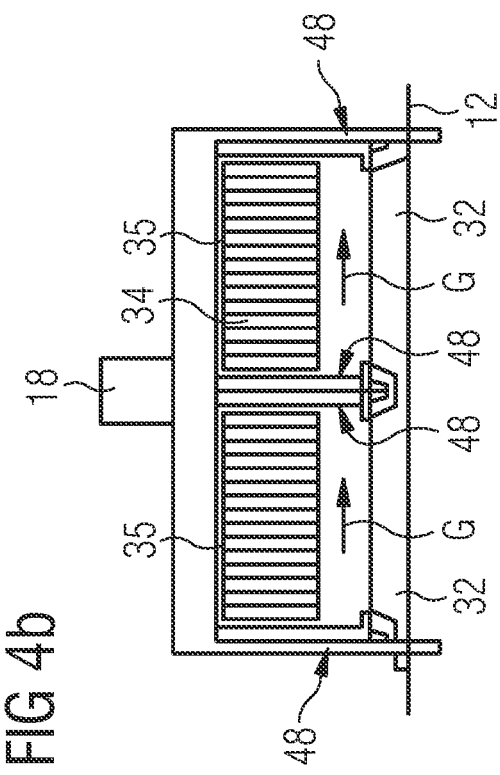
FIG. 4a)-d) show alternative embodiments of a mobile production unit which may be used in the apparatus according to FIG. 1.

In FIGS. 4a)-d), alternative embodiments of the mobile production units 24 are shown. Within said figures, similar features will be referred to with similar reference signs as in the first embodiment.

In FIG. 4a), the irradiation device 34 comprises a plurality of irradiation sources 35, each emitting an individual radiation beam. Furthermore, a shielding gas system 48 is shown which is directly integrated into the interior space 36 of the mobile production unit 24. The shielding gas system 48 comprises two gas lines 50, 52 per irradiation source 35, whose openings face each other. Specifically and with respect to the left shielding gas system 48 of FIG. 4a), a first gas line 50 comprises a gas outlet opening into a space below of the left irradiation source 35. A second gas line 52, on the other hand, is arranged at an opposite side of the irradiation source 35 and comprises a gas inlet. This way, a gas stream G between the gas lines 50 and 52 can be produced running along a surface of the carrier 12 or any material 14 deposited thereon. A similar gas stream G can be produced for the right irradiation source 35 as well. Finally, a layer depositing mechanism 32 in form of a blade is shown for levelling the raw material powder 14 that is deposited on the carrier 12. Note that even further irradiation sources 35 could be provided, each preferably having an own shielding gas system 48.

Figure 4B:
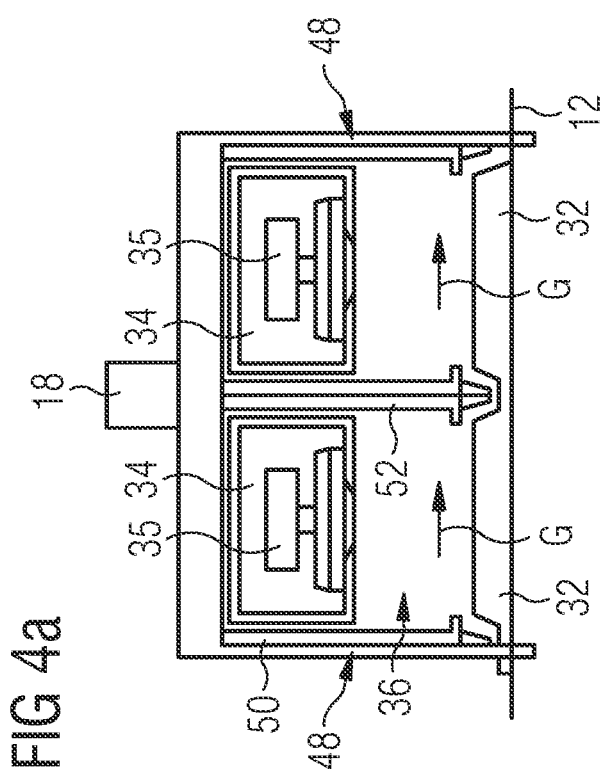

In FIG. 4b), a setup of at least two groups irradiation sources 35 of the irradiation device 34 is shown. Again, each of the groups of irradiation sources 35 is provided with an own shielding gas system 48 for generating an individual gas stream G. In this embodiment, however, the irradiation sources 35 do not form a standard laser source emitting a single radiation beam. Instead, the irradiation sources 35 comprise so-called VCSELs or laser LEDs and are grouped in a matrix or grid like pattern. By activating only dedicated ones from said matrix, a predetermined irradiation pattern can be produced.

Figure 4D:
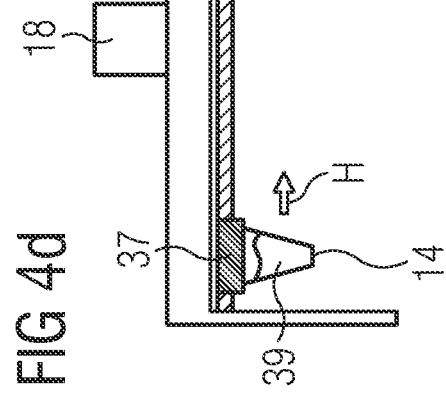
Figure 4C:
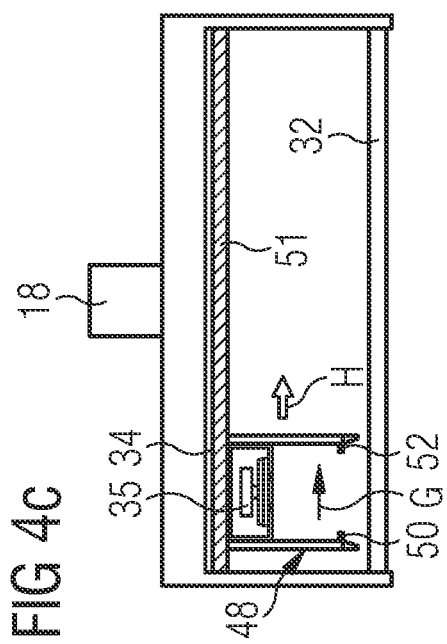

In FIG. 4c), only one irradiation device 34 is provided which is movable along a linear axis 51 as indicated by the horizontal arrow H. Note that it is also conceivable to provide a plurality of irradiation devices 34 each being arranged at a respective linear axis 51 as well as behind one another along an axis extending orthogonally to the plane of FIG. 4c). Again, the irradiation device 34 comprises a laser-emitting radiation source 35 as well as a shielding gas system 48 producing a gas stream G as discussed above.

Finally, in FIG. 4d) a mobile production unit 24 is shown, comprising an alternative solidification unit in form of a material printing head 37. The material printing head 37 includes an internal material storage 39 in which molten raw material 14 is contained. Said material 14 can be deposited at predetermined sites on the carrier 12 to then solidify thereat. This working principle may generally be referred to as material jetting. Again, the printing head 37 is displaceable along a horizontal axis 51 (see arrow H).

The invention claimed is:

1. Apparatus for producing a three-dimensional workpiece, comprising:
   a carrier adapted to receive material for producing the workpiece;
   at least one mobile production unit, comprising:
      a solidification device adapted to produce solidified material layers on the carrier in order to produce the workpiece by an additive layer construction method;
      a gas supply system adapted to supply, along a material layer on top of the carrier, a shielding gas to an area that is to be irradiated; and
   the apparatus further comprising:
      a moving unit that is adapted to move the mobile production unit relative to the carrier so as to position the mobile production unit oppositely to different sections of the carrier;
      a sensing unit that is adapted to generate sensor signals relating to a relative arrangement of the mobile production unit and the carrier; and
      a control unit that is configured to, in addition to the positioning of the mobile production unit via the moving unit, provide at least one fine positioning function to compensate for an offset from a desired relative arrangement of the mobile production unit and the carrier based on the sensor signals generated by the sensing unit.

2. The apparatus according to claim 1, wherein an area of the carrier receiving the material is larger than an area that can be solidified by the mobile production unit without being moved by the moving unit.

3. The apparatus according to claim 1, wherein the solidification device comprises an irradiation device for selectively irradiating electromagnetic or particle radiation onto predetermined sites of the material applied onto the carrier.

4. The apparatus according to claim 3, wherein the fine positioning function includes adjusting a state and/or position of at least one component of the irradiation device.

5. The apparatus according to claim 3, wherein the fine positioning function includes identifying an irradiation start point.

6. The apparatus according to claim 1, wherein the solidification device comprises a printing head that is adapted to deposit the material so as to solidify at predetermined sites on the carrier.

7. The apparatus according to claim 1, wherein the fine positioning function includes adjusting a relative position between the mobile production unit and/or selected components thereof and the carrier.

8. The apparatus according to claim 7, wherein the relative position is adjusted by moving the mobile production unit in an orthogonal direction with respect to the carrier.

9. The apparatus according to claim 1, wherein the sensing unit includes distance sensors that are adapted to measure a distance between the mobile production unit and the carrier and/or an uppermost material layer deposited thereon.

10. The apparatus according to claim 9, wherein the distance sensors are arranged at the mobile production unit so as to face the carrier.

11. The apparatus according to claim 1, wherein the sensing unit includes a sensor system that is adapted to measure a position of the mobile production unit within a plane extending in parallel to the carrier.

12. The apparatus according to claim 11, wherein the sensor system includes at least one marker and at least one sensor adapted to sense a position of the marker and, optionally, wherein one of the marker and sensor is arranged at the mobile production unit and the other of the marker and sensor is arranged remote from the mobile production unit.

13. The apparatus according to claim 1, wherein the moving unit is configured according to at least one of the following:
   the moving unit comprises at least one manipulator;
   the moving unit is mounted to a horizontal moving device for moving the moving unit along at least one horizontal spatial axis; and
   the moving unit is adapted to move the mobile production unit in discrete steps and/or to move the mobile production unit in parallel to performing a solidification of the material.

14. The apparatus according to claim 1, wherein the apparatus further comprises at least one of the following:
   a further mobile production unit including an individually assigned further moving unit, wherein the moving units of the apparatus are movable independently of one another;
   a further carrier, wherein the mobile production unit is preferably arrangeable above both carriers of the apparatus; and
   at least one post-processing unit that is configured to perform at least one of the following:
      removing non-solidified material from the carrier and/or the workpiece;
      removing burrs from the produced workpiece;
      removing support structures from the workpiece; and
      separating the produced workpiece from the carrier.

* * * * *